United States Patent
Satoh (10) Patent No.: US 8,352,664 B2
(45) Date of Patent: Jan. 8, 2013

(54) INFORMATION PROCESSING APPARATUS INCLUDING FIRST AND SECOND DATA PROCESSORS HAVING PLURAL POWER CONSUMPTION MODES AND ASSOCIATED METHODOLOGY

(75) Inventor: Shohichi Satoh, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 430 days.

(21) Appl. No.: 12/430,995

(22) Filed: Apr. 28, 2009

(65) Prior Publication Data
US 2009/0282278 A1    Nov. 12, 2009

(30) Foreign Application Priority Data
May 6, 2008 (JP) ................................. 2008-148284

(51) Int. Cl.
G06F 1/32    (2006.01)
(52) U.S. Cl. ......... 710/310; 710/320; 710/323; 710/324
(58) Field of Classification Search .................. 713/310, 713/320, 323, 324
See application file for complete search history.

(56) References Cited

U.S. PATENT DOCUMENTS

| | | | |
|---|---|---|---|
| 6,526,507 B1 * | 2/2003 | Cromer et al. ................ | 713/162 |
| 6,701,442 B1 * | 3/2004 | Kunz et al. ..................... | 713/300 |
| 7,577,857 B1 * | 8/2009 | Henderson et al. ........... | 713/320 |
| 2005/0007628 A1 | 1/2005 | Yamano et al. | |
| 2005/0216776 A1 | 9/2005 | Watanabe | |
| 2007/0113105 A1 * | 5/2007 | Campbell et al. ............. | 713/300 |
| 2008/0099974 A1 | 5/2008 | Nomura et al. | |
| 2008/0130033 A1 | 6/2008 | Satoh | |
| 2009/0063878 A1 * | 3/2009 | Schmidt et al. ................ | 713/310 |
| 2009/0135751 A1 * | 5/2009 | Hodges et al. ................ | 370/311 |
| 2009/0172443 A1 * | 7/2009 | Rothman et al. .............. | 713/323 |

FOREIGN PATENT DOCUMENTS

| | | |
|---|---|---|
| JP | 2005-267100 | 9/2005 |
| JP | 2006-259906 | 9/2006 |
| JP | 2007-183797 | 7/2007 |
| WO | WO 2009/070367 A1 | 6/2009 |

OTHER PUBLICATIONS

Yuvraj Agarwal, et al., "Somniloquy: Maintaining Network Connectivity While Your Computer Sleeps", Microsoft Research Technical Report, vol. MSR-TR-2008-42, XP-002594547, Mar. 31, 2008, 14 pages.
Extended European Search Report issued Sep. 2, 2010, in European Patent Application No. 09251204.5-1245 / 2131265.
Office Action issued Feb. 16, 2012, in Japanese Patent Application No. 2008-148284.

* cited by examiner

*Primary Examiner* — Glenn A Auve
(74) *Attorney, Agent, or Firm* — Oblon, Spivak, McClelland, Maier & Neustadt, L.L.P.

(57) ABSTRACT

An information processing apparatus including a first data processor processing data sent from an external device, which can switch a power consumption mode thereof; a switcher configured to switch the mode of the first data processing device from the standard power mode to a power saving mode or vice versa; and a second data processor processing the data sent from the external device when the first data processor is in the power saving mode. The second data processor includes a first judging device making a judgment whether the data are to be processed by the first or second data processor depending on the data; and a connection establishing device establishing communication connection with the external device when the first judging device cannot make the judgment from the data.

14 Claims, 7 Drawing Sheets

INFORMATION PROCESSING APPARATUS INCLUDING FIRST AND SECOND DATA PROCESSORS HAVING PLURAL POWER CONSUMPTION MODES AND ASSOCIATED METHODOLOGY

BACKGROUND OF THE INVENTION

1. Field of the Invention

The present invention relates to an information processing apparatus, and more particularly to an image processing apparatus, which has an energy saving mode function and is connected with an external device through a network. In addition, the present invention relates to a method for controlling an information processing apparatus, and a computer readable medium storing instructions for performing the method.

2. Discussion of the Background

Recently, network systems are popularized, in which plural information processing apparatus such as computer and printers are connected with a network such as Ethernet™ and LANs to perform data communication therebetween. As one of such information processing apparatus, published unexamined Japanese patent application No. 2005-267100 discloses an image forming apparatus which includes a main CPU (central processing unit) and a sub CPU to process data received from external devices, wherein the powers to one of the main CPU and sub CPU, and part of the apparatus temporarily turn off to reduce the power consumption thereof.

In this background image forming apparatus, when a power saving mode is adopted, the main CPU turns off while the sub CPU, which has a relatively low power consumption, performs predetermined controlling processing and data processing (such as processing of packets received from external devices) to reduce the power consumption. However, when the received data cannot be processed by the sub CPU or when it is necessary to establish connection with the sender upon receipt of a packet such as TCP (Transmission Control Protocol), the main CPU has to be returned to the standard power mode to process the received data. Therefore, every time similar data are received, the main CPU has to be returned to the standard power mode to process the data independently of the contents of the data. Accordingly, the image forming apparatus cannot maintain the power saving mode for a long time, thereby lessening the power saving effect of the apparatus.

In addition, periodical query protocols using TCP such as WSD (Web Service on Devices), which have been seldom used, are broadly used recently. Therefore, it is necessary for such an image forming apparatus to frequently return the main CPU to the standard power mode, resulting in shortening of the period during which the main CPU is in a power saving mode (i.e., the period during which the main CPU is in the standard power mode increases). Thus, in such conventional information processing apparatus having a power saving mode function, the power saving mode cannot be maintained for a long period of time and therefore the apparatus produce a little power consumption reduction effect.

Because of these reasons, a need exists for an information processing apparatus, which can change the power consumption mode from a standard power mode to a power saving mode or vice versa, wherein the frequency of changing the mode from the power saving mode to the standard power mode is decreased (i.e., the power saving mode can be maintained for a relatively long time) to enhance the power saving effect thereof.

SUMMARY OF THE INVENTION

As an aspect of the present invention, an information processing apparatus is provided, which performs data communication with an external device. The apparatus includes:

a first data processor, which is configured to process the data sent from the external device and which can switch the power consumption mode thereof from a standard power mode, in which the first data processor performs data processing, to a power saving mode, in which the first data processor does not perform data processing, or vice versa;

a switcher configured to switch the power consumption mode of the first data processing device from the standard power mode to the power saving mode or vice versa; and a second data processor configured to process the data sent from the external device when the first data processor is in the power saving mode.

The second data processor includes a first judging device configured to make a judgment as to whether the data should be processed by the first data processor or the second data processor depending on the data, and a connection establishing device configured to establish communication connection with the external device to receive data following the data when the first judging device cannot make the judgment from the previously received data.

As another aspect of the present invention, a method for controlling an information processing apparatus is provided. The information processing apparatus includes a first data processor which is configured to process the data sent from an external device and which can switch the power consumption mode thereof from a standard power mode to a power saving mode; and a second data processor configured to process the data sent to the apparatus when the first data processor is in the power saving mode.

The method includes:

switching the power consumption mode of the first data processing device from the standard power mode to the power saving mode or vice versa; and processing the data sent from the external device using the second data processor when the first data processor is in the power saving mode.

The data processing step includes:

making a first judgment as to whether the data should be processed by the first data processor or the second data processor depending on the data; and establishing communication connection with the external device to receive data following the data when the first judging device cannot make the judgment from the previously received data.

As yet another aspect of the present invention, a computer readable medium storing computer instructions for performing the method is provided.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Hereinafter, an example of the information processing apparatus of the present invention will be explained by reference to drawings.

The information processing apparatus according to an embodiment of the present invention is connected with an external device through a communication tool to communicate with the external device (i.e., to send and receive data). In addition, the information processing apparatus has a power saving function such that when a predetermined condition is satisfied, the apparatus is transferred to a power saving mode to reduce power consumption thereof. Namely, the apparatus can switch its power consumption mode from a standard power mode to a power saving mode or vice versa.

Hereinafter, a printer, which is an example of the information processing apparatus of the present invention and which is connected with a network (such as Ethernet™) to communicate with plural external devices (i.e., network devices), will be explained.

Figure 1:
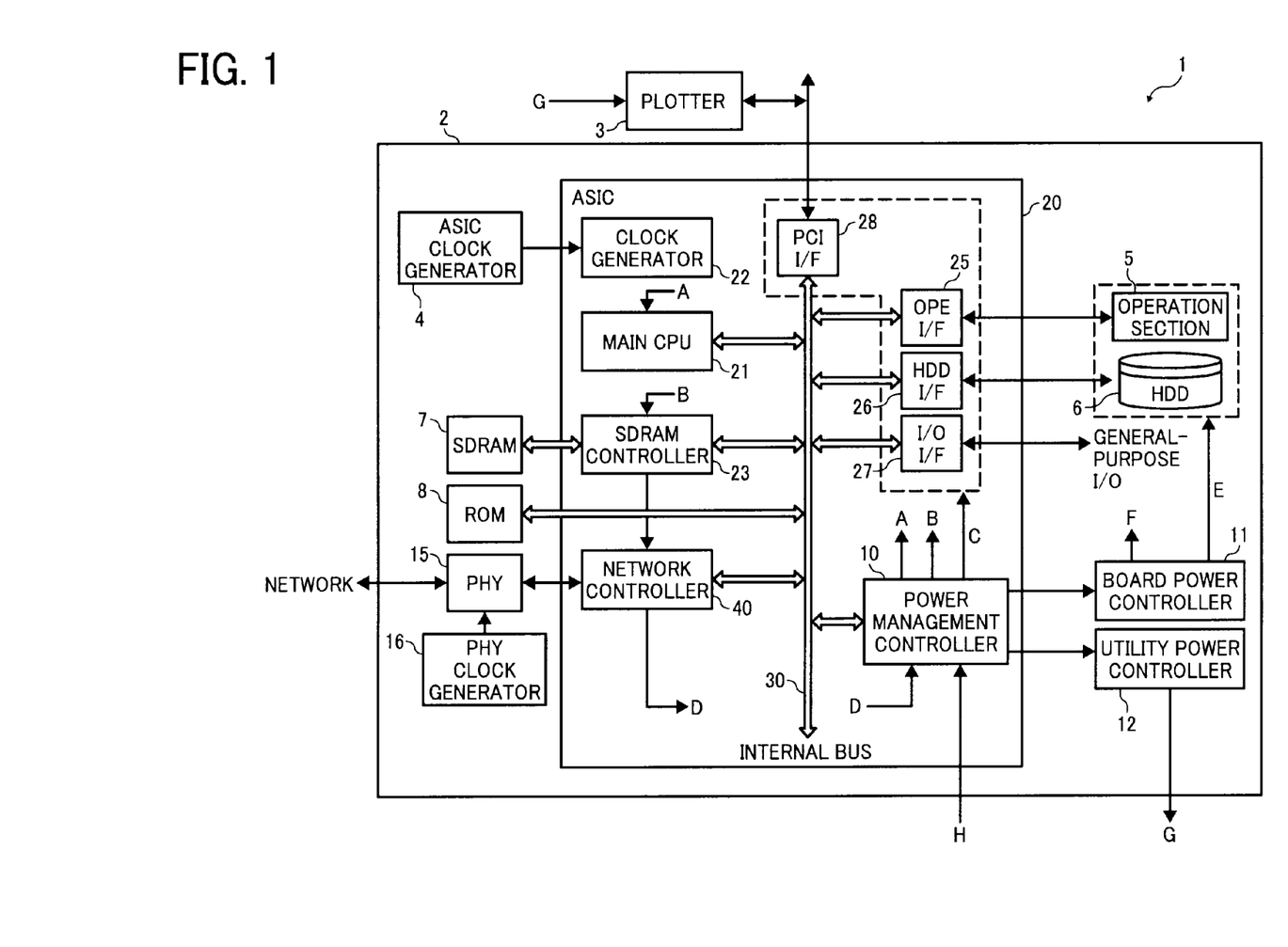
FIG. 1 is a block diagram of an image processing apparatus (printer) according to an embodiment of the present invention.

FIG. 1 is a block diagram illustrating the main portion of a printer according to an embodiment of the present invention.

Referring to FIG. 1, a printer 1 includes a controller board 2 configured to control the entire of the printer; and a plotter 3 configured to perform printing. When the printer 1 receives a print request from an external device, the controller board 2 controls the printer so that the plotter 3 prints the requested image.

The controller board 2 includes an ASIC (Application Specific Integrated Circuit) 20; an ASIC clock generator 4, which generates a clock signal and supplies the clock signal to the ASIC 20; an operation section 5 used when users operate the printer; a hard disk drive (HDD) 6 configured to store data; a SDRAM (Synchronous DRAM) 7 which is a work memory; and a ROM 8 configured to store programs. In addition, the controller board 2 includes a board power controller 11 and a utility power controller 12, each of which is connected with a power management controller 10 (explained later) of the ASIC 20; a physical layer (PHY) 15 serving as a connector with a network and configured to form a network physical layer; and a PHY clock generator 16 configured to generate a clock signal for the PHY 15.

The ASIC 20 processes the data received from external devices through a network and performs data processing needed for controlling the operations of parts of the printer 1. Namely, the ASIC 20 serves as a main controller and a data processor of the printer 1. Therefore, the ASIC 20 includes a main CPU 21 configured to perform various data processing and calculation while controlling the entire of the printer 1; and a network controller 40 configured to perform network communication with external devices. In addition, the ASIC 20 includes a clock generator 22 connected with the ASIC clock generator 4; a SDRAM controller 23 connected with the SDRAM 7; and the power management controller 10 configured to perform power controlling of the printer 1. Further, the ASIC 20 includes an operation interface (OPE·I/F) 25 used for connecting the ASIC with the operation section 5; a HDD·I/F 26 used for connecting the ASIC with the HDD 6; an I/O·I/F 27 configured to control external input/output; and a PCI·I/F 28 used for connecting the ASIC with the plotter 3. Furthermore, the ASIC 20 includes an internal BUS 30 configured to connect the above-mentioned parts of the printer to send and receive data therebetween. Namely, all of the controlling processing and data transfer in the printer 1 are performed through the internal BUS 30.

The clock generator 22 includes a device configured to change the frequency (operating frequency) of the clock signal generated and supplied by the ASIC clock generator 4 while being controlled by the power management controller 10. Specifically, the clock generator 22 changes the frequency of the clock signal to plural frequencies and supplies the plural clocks with different frequencies to the ASIC 20 including the main CPU 21, which performs data processing and controlling, to change the power consumption mode thereof.

The SDRAM controller 23 controls the SDRAM 7 to allow the SDRAM to perform reading/writing data and to change the operating state thereof (i.e., to change the power consumption mode of the SDRAM 7 to a self refresh mode or return to the standard power mode). In addition, the SDRAM controller 23 outputs a signal to the network controller 40 to inform whether the state of the SDRAM 7 is the self refresh mode or the standard power mode.

The network controller 40 includes a MAC (Media Access Controller) (not shown) to control communication through a network, i.e., to communicate the ASIC 20 and main CPU 21 with external devices through the PHY 15. In addition, the network controller 40 performs data sending/receiving by being connected with the PHY 15. Specifically, the network controller 40 serves as an intermediary when the ASIC 20 performs sending/receiving of data (such as packets (network packets) through the PHY 15 and a network). Thus, the network controller 40 serves as a communication device for communicating with eternal devices connected through a network together with the PHY 15, etc.

The power management controller 10 performs power controlling (such as supply or stop of power for the printer 1 (i.e., inside and outside of the ASIC 20)) upon receipt of control signals from the main CPU 21 through the internal BUS and output signals D and H from the various parts of the printer connected with the power management controller. The signal D input to the power management controller 10 is plural signals output from the network controller 40, and includes, for example, signals output from the network controller 40 when the network controller receives specific packets or data. The signal H is plural signals output from the outside of the ASIC 20, for example, signals output when an energy-save return/transition key (not shown) is pushed.

The power management controller 10 controls the power for various parts of the printer 1 according to the signals D and H. Specifically, the power management controller 10 allows the printer 1 and the various parts of the printer to achieve an energy saving mode (power saving mode) or return to the standard power mode from the energy saving mode by switching the power consumption modes or operating states of the parts. Therefore, each of the signals D and H includes signals used for switching the power consumption modes of the ASIC 20, the main CPU 21, and SDRAM 7; signals used for supplying or stopping the power for the parts of the controller board 2 and ASIC 20; and signals used for supplying or stopping a power for the plotter 3. In this regard, the printer 1 has plural power saving modes (in this example, three power saving modes) and a standard power mode, which have different power consumption. The power management controller 10 performs energy-save transition controlling between the modes. Namely, the power management controller 10 serves as a power controller configured to perform switch controlling between the standard power mode and the three power saving modes for the printer 1 and the parts of the printer.

Next, the four power consumption modes of the printer 1 will be explained.

1. Standard Power Mode

In the standard power mode, an electric power is supplied to the entire of the printer 1 so that all the parts of the printer are energized. In this case, both the main CPU 21 and the ASIC 20 achieve a standard operation state by receiving the standard electric power. The power consumption of the printer 1 in this mode is the highest among the four power consumption modes.

2. Controller Mode

The controller mode is a first power saving mode in which an electric power is supplied to the entire of the controller board 2 to energize the controller board without supplying a power only to the plotter 3. Therefore, the main CPU 21 and the ASIC 20 are in the standard power mode.

3. Network Mode

The network mode is a second power saving mode in which a power is not supplied to the operation section 5 and the HDD 6 of the controller board 2, which are surrounded by a dotted line in FIG. 1, and the interfaces 25-28 of the ASIC 20, which are also surrounded by another dotted line in FIG. 1, in addition to the plotter 3. In this regard, a power is supplied to the other parts of the controller board 2 and the ASIC 20, and the main CPU 21 and the ASIC 20 are in the standard power mode. Thus, the power consumption of the apparatus in the network mode is lower than that in the controller mode.

4. Standby Mode

In the standby mode, which is a third power saving mode, only the states of the main CPU 21 and the SDRAM 7 are different from those in the network mode, and the states of the other parts are the same as those in the network mode. In this case, the main CPU 21 is allowed to achieve a sleep mode in which a clock signal is not supplied to the main CPU, and the SDRAM 7 is allowed to achieve a self refresh mode, which is a power saving mode. Thus, the main CPU is allowed to achieve a stopped state, i.e., to achieve a power saving mode. Therefore, the power consumption in the standby mode is the lowest among the four power consumption modes.

As mentioned above, in the printer 1 the main CPU 21 and the ASIC 20 achieves the standard power mode or are switched to one of one or more power saving modes (in this example, one power saving mode (i.e., sleep mode or self refresh mode)), which have different power consumption and in which the main CPU and ASIC consume less power than in the standard power mode. By switching the modes, the power consumption of the main CPU 21 and the ASIC 20 can be changed. Thus, the states of the main CPU 21 and the ASIC 20 are changed depending on the power consumption mode of the printer 1. For example, the power consumption mode is switched from the standard power mode, in which data received from external devices through the network controller 40 can be processed, to a power saving mode, in which data received from external devices cannot be processed.

In this example, by stopping sending of a clock signal to the main CPU 21, the main CPU is allowed to achieve a stopping state, i.e., the sleep mode, thereby switching the mode of each of the main CPU and the ASIC to a power saving mode. However, it is possible to use another method for switching the mode thereof to a power saving mode. For example, it is possible to use a method in which by decreasing the frequency of the clock signal generated by the clock generator 22 so as to be lower than that in the standard power mode, the main CPU 21 is allowed to achieve the sleep mode or the power supplied to the main CPU is stopped, so that the main CPU achieves a power saving mode. Thus, the power saving mode of the main CPU 21 includes not only a mode in which the power supplied thereto is stopped, but also a mode in which a power is supplied thereto while limiting the operations thereof, resulting in decrease of the power consumption of the main CPU.

The power consumption mode switching operation (i.e., transition/return operation) of the printer 1 and the parts of the printer such as main CPU 21 is performed by a method in which the main CPU orders the power management controller 10 through the internal BUS 30 of the main CPU to set a power consumption mode, or a method in which the power management controller 10 performs the controlling for the switching operation upon receipt of the signal D or H. In this regard, the power management controller 10 directly or indirectly outputs predetermined signals A, B, C, E, F and G to the corresponding devices and blocks of the printer 1.

Specifically, the signal A output from the power management controller 10 causes interruption to the main CPU 21, and allows the main CPU 21 and the ASIC 20 to achieve a working state or a sleep state (i.e., sleep mode). In this case, the power management controller 10 requests to change (switch) the power consumption mode of the main CPU 21 from one of the above-mentioned modes to another mode, resulting in change of the power consumption. Thus, the power management controller 10 serves as a part of a power consumption mode switch requesting device and a part of a power consumption mode switching device (i.e., a switcher), which switches the power consumption mode from the standard power mode to a power saving mode or vice versa.

In contrast, the signal B output from the power management controller 10 allows the SDRAM 7 to switch the power consumption mode thereof from the standard power mode to the self refresh mode or vice versa through the SDRAM controller 23. In addition, the signal C output from the power management controller 10 stops or supplies the power to the OPE·I/F 25, HDD·I/F 26, I/O·I/F 27, and PCI·I/F 28 of the ASIC 20, which are surrounded by a dotted line in FIG. 1.

The signals E and F are output from the power management controller 10 through the board power controller 11. The signal E stops or supplies the power to the operation section 5 and the HDD 6 of the controller board 2, which are surrounded by a dotted line in FIG. 1. The signal F is used for controlling the power supplied to the other parts of the controller board 2. For example, the signal F is used for stopping or supplying the power for pull-up. The signal G is output from the power management controller 10 through the external power controller 12 to control the external power supplied to the controller board 2. For example, the signal G is output to the plotter 3 to control the power thereto.

In this example, the network controller 40 of the ASIC 20 is connected with the PHY 15 so that the network controller 40 controls data communication performed through the PHY 15. Even when the printer 1 is in a power saving mode, a power is supplied to the PHY 15 and the network controller 40 so that the network controller 40 processes part of data (such as packets) received from external devices. Namely, the network controller 40 serves as a communication controller for controlling communication with external devices, while serving as a data processor, which processes the predetermined data received through the PHY 15 without intervention of the ASIC 20 and the main CPU 21 when the ASIC 20 and the main CPU 21 are in a power saving mode.

Figure 2:
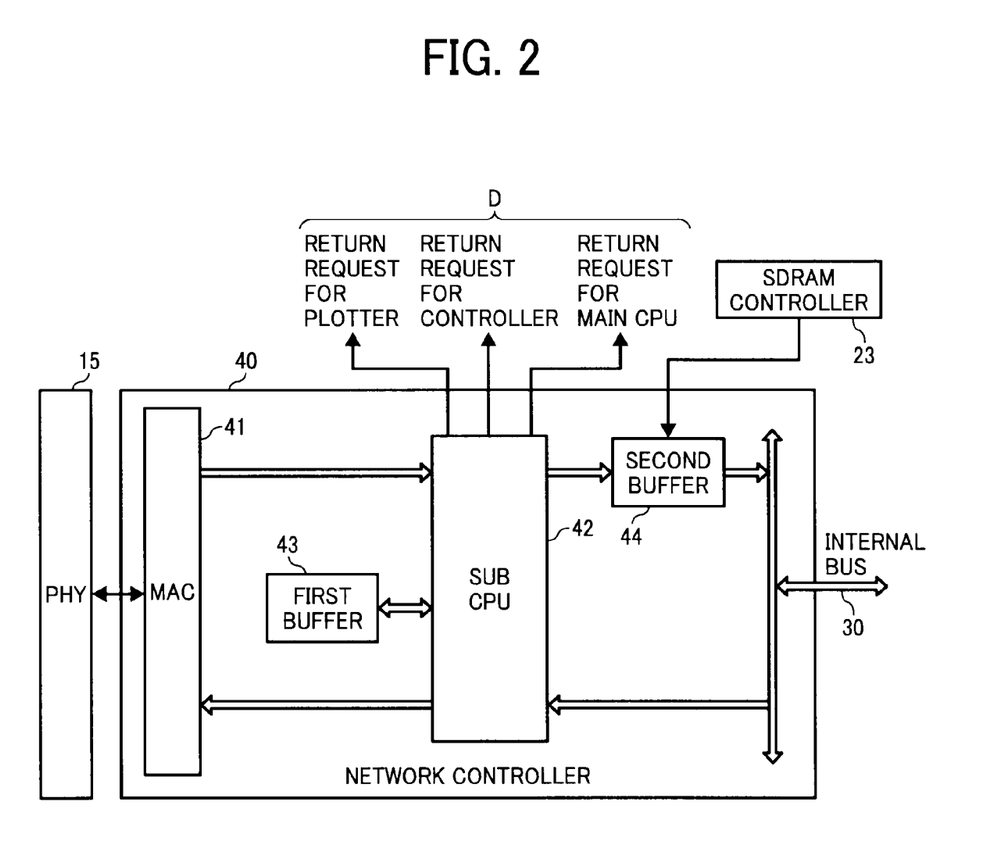
FIG. 2 is a block diagram of the network controller of the image processing apparatus illustrated in FIG. 1.

FIG. 2 is a block diagram of the network controller 40, and schematically illustrates the main portion thereof and data transmission path using blocks and arrows.

Referring to FIG. 2, the network controller 40 includes a MAC 41, which is a media access controller for performing communication with external devices through the PHY 15; a CPU 42 (hereinafter referred to as a sub CPU) configured to process received data while performing the controlling operations, etc. of the network controller 40; and first and second buffers 43 and 44 configured to temporarily store the received data.

In this network controller 40, the MAC 41 receives data from external devices through the PHY 15 and transfers the data to the sub CPU 42. The sub CPU 42 processes the data depending on the power consumption mode of the printer 1 or the like. Thus, the sub CPU 42 of the network controller 40 serves as a second data processor processing the received data while the main CPU 21 serves as a first data processor processing the received data. Specifically, the sub CPU 42 performs data processing when the main CPU 21 is in a power saving mode and therefore cannot perform data processing. In addition, the sub CPU 42 performs data processing depending on the kind of the data even when the main CPU 21 is in the standard power mode.

Specifically, the sub CPU 42 analyzes the received data (such as packets) to determine the kind of the data, and determines whether or not a processing is necessary for the data. When it is determined that a processing is not necessary for the data, the sub CPU 42 erases the data. When it is determined that a processing is necessary for the data, the sub CPU 42 makes a judgment as to whether or not the network controller 40 can perform the processing for the data. When it is determined that the processing can be performed by the network controller 40, the sub CPU 42 performs the processing to respond to the sender. For example, the sub CPU 42 prepares a response packet in consideration of the kind of the received data, and sends the response packet to the sender through the MAC 41 and the PHY 15. When it is determined that the processing cannot be performed by the network controller 40, the sub CPU 42 outputs a return request signal to the main CPU 21 (and other devices such as ASIC 20 and controller board 2 if necessary) or the plotter 3, so that a predetermined processing is performed for the data by such a device.

Specifically, the sub CPU 42 of the network controller 40 determines the kind of the data (e.g., whether the addressee is the printer 1, or broadcast or multicast) on the basis of the information included in the packet such as address of the sender, MAC address of the addressee, and IP address of the addressee). When the sub CPU 42 determines that it is unnecessary to process the data by itself (i.e., by the network controller 40), the sub CPU erases the packet. Thus, the sub CPU 42 checks the received data (such as packets) in consideration of the address to determine whether or not to pass the data. Thus, the sub CPU 42 performs a filtering processing. In the case where the received data are not erased, the sub CPU 42 then checks the data by scanning whether or not the data include a predetermined pattern. When the data do not include a predetermined pattern, the sub CPU erases the data. The data (packets), which are not erased and which are to be processed, are transferred to the buffers 43 and 44 or subjected to the processing mentioned below.

In this regard, specific examples of the data to be processed include the WSD mentioned above, MIB (Management Information Base), SNMP (Simple Network Management Protocol), request for read-out of a stored image, print request, print data, ARP (Address Resolution Protocol) request, PING (Packet Internet Groper) request, WSD packets, predetermined protocol packets, TCP packets, UDP (User Datagram Protocol) packets, etc. These data are identified by the port number attached thereto, and it is judged whether or not a processing is necessary for the data. Since information such as passable addresses, specific patterns used for scanning, and passable port numbers can be preset in the main CPU 21, the information is read out in this filtering processing so as to be registered in a register (not shown).

The sub CPU 42 performs processing on the basis of the preset conditions mentioned above. For example, when the received data (packet) are an APR request packet or a PING request packet, the sub PCU 42 generates a response packet in consideration of the kind of the received packet, and sends the response packet to the network through the MAC 41 and the PHY 15. Thus, the network controller 40 automatically responds to the data, which are frequently received and to which the network controller can respond relatively easily, without using the main CPU 21 (i.e., without returning the main CPU to the standard power mode). Therefore, the main CPU can maintain a power saving mode.

In contrast, when the data sent from an external device are a packet of requesting establishment of connection with the sender (information on which sender is included in the communication data) such as TCP packets and UDP packets, the sub CPU 42 of the network controller 40 makes a judgment on the basis of the information on the port number and the preset conditions. In this regard, the sub CPU makes the following judgment:
(1) Whether the received data should be erased;
(2) Whether the sub CPU 42 or the main CPU performs a processing for the data; and
(3) Whether the sub CPU 42 once establishes connection with the sender.

Depending on the judgment results, the sub CPU 42 erases the data, transfers the data to the second buffer 44 or generates a response packet to the received data, which are to be processed by the sub CPU, and sends the response packet to the external device through the MAC 41 and the PHY 15.

Thus, the sub CPU 42 serves as a first judging device, which analyzes the data received from an external device to determine whether or not a processing is necessary for the data, and determines whether the data should be processed by the ASIC 20 (i.e., main CPU 21) or network controller 40 (i.e., sub CPU 42) if it is determined that a processing is necessary for the data. In addition, when it is determined that the data can be processed by itself, the sub CPU 42 performs a processing for the data while the main CPU 21 maintains a power saving mode. When it is judged that the data should be processed by the main CPU 21, the sub CPU 42 requests the main CPU to return to the standard power mode and transfers the received data to the main CPU. Thereby, the power consumption mode of the main CPU 21 is switched from the power saving mode to the standard power mode and the main CPU performs a processing for the data.

In this regard, the network controller 40 stores the received data to be processed by the main CPU 21 in the second buffer 44 or once stores the data and following series of data (such as TCP packets) in the first buffer 43 and then transfers the data to the second buffer 44 to be stored therein. Next, the network controller 40 instantly transfers the data stored in the second buffer 44 to the SDRAM 7 through the internal BUS 30 and the SDRAM controller 23 when the network controller is notified by the SDRAM controller 23 that the SDRAM is in the standard power mode. When the network controller 40 is notified by the SDRAM controller 23 that the SDRAM 7 is in the self refresh mode, the data are still stored in the second buffer 44 until the network controller 40 is notified by the SDRAM controller 23 that the SDRAM 7 achieves the standard power mode. After the SDRAM 7 achieves the standard power mode, the data are transferred from the second buffer 44 to the SDRAM 7 to be stored therein.

In addition, the network controller 40 outputs a predetermined return request signal D to the power management controller 10 so that the main CPU 21 of the ASIC 20 processes the data and then the printer 1 performs a corresponding processing. The return request signal D is a signal of requesting for the main CPU 21, the ASIC 20 or the controller board 2 to switch the mode thereof from a power saving mode to the standard power mode. In this regard, the sub CPU 42 outputs return request signal D after adding information thereto, which concerns the power saving mode to be achieved by the main CPU 21, the ASIC 20 or the controller board 2 and which is determined depending on the received data.

In this regard, when the received data are a print request using TCP, it is judged from analysis of the destination port number of the TCP packet that the main CPU 21 should perform a processing for the data. Next, the sub CPU 42 outputs the signal D including a return request for the plotter 3 (plotter return request) to the power management controller 10 so that the main CPU 21 achieves the standard power mode and the plotter 3 achieves the printable state. Upon receipt of the signal D, the power management controller 10 outputs a signal corresponding to the present power consumption mode of the printer 1. For example, when the power consumption mode of the printer 1 is the controller mode mentioned above, the power management controller 10 outputs a signal to the external power controller 12 to allow the external power controller to output the signal G (illustrated in FIG. 1) to the plotter 3. By outputting the signal G, a power is supplied to the plotter 3, and thereby the mode of the plotter is switched from the power saving mode to the standard power mode.

When the received data are a request using TCP to read out an image stored in the HDD 6, it is judged from analysis of the destination port number of the TCP packet that the main CPU 21 should perform a processing for the data. Similarly to the above case, the sub CPU 42 outputs the signal D including a return request for the controller board 2 (controller board return request) to the power management controller 10. Upon receipt of the signal D, the power management controller 10 outputs the signal C and the signal E through the board power controller 11, for example, when the mode of the printer 1 is the above-mentioned network mode. By outputting the signals C and E, a power is supplied to the interfaces 25-28 of the ASIC 20, and the operation section 5 and the HDD 6 of the controller board 2 so that they achieve a movable state. In addition, the mode of the HDD·I/F 26 and the HDD 6 is switched from a power saving mode to the standard power mode while maintaining the plotter 3 in the power saving mode.

When the received data are a MIB request packet using UDP, it is judged from analysis of the destination port number of the UDP packet that the main CPU 21 should perform a processing for the data. In this case, the sub CPU 42 outputs the signal D including a return request for the main CPU 21 (main CPU return request) to the power management controller 10. Upon receipt of the signal D, for example, when the printer 1 is in the standby mode, the power management controller 10 outputs the signals A and B to switch the power consumption mode of the main CPU 21 and the SDRAM 7 while maintaining the power saving modes of the plotter 3 and part of the controller board 2 and the ASIC 20. Thereby, the main CPU 21 is returned from the power saving mode to the standard power mode, the SDRAM 7 is returned from the self refresh mode to the standard power mode, and the printer 1 is transited to the network mode. In addition, the main CPU 21 performs the predetermined data processing.

For example, when the received data are a WSD packet, it cannot be determined from the port number of the first packet requesting connection establishment whether the data are a periodical query which the sub CPU 42 can deal with or a request to be fulfilled by the main CPU 21. Therefore, in this case, at first the sub CPU 42 establishes communication connection to fulfill the request (i.e., the sub CPU 42 serves as a connection establishing device), and then analyzes the following data to determine whether the main CPU 21 should process the data. Thus, the data are processed by the sub CPU 42 or the main CPU 21.

As mentioned above, depending on the kind of the received data, there is a case where it cannot be determined at once whether the sub CPU 42 or the main CPU 21 should process the data, and it is necessary to judge from the following data. In this case, the sub CPU 42 of the network controller 40 establishes communication connection with the external device sending the data while maintaining the main CPU 21 in the power saving mode (i.e., without returning the main CPU 21 to the standard power mode). In addition, when following data are received from the external device after establishment of the connection, the data are analyzed to determine whether the initial data and the following data should be processed by the main CPU 21 or the sub CPU 42. Thus, the sub CPU 42 serves as a second judging device configured to determine the processor for processing the series of received data after establishment of connection. When it is determined that the sub CPU 42 should process the received data (including the initial data and subsequent data), the sub CPU processes the data.

In addition, when new data are received from another external device, with which connection is not established, while the sub CPU 42 is processing the previously received data, the network controller 40 judges whether the new data should be processed by the main CPU 21 or the sub CPU 42. When it is judged that the new data should be processed by the main CPU 21, the sub CPU 42 outputs the return request signal D to request the main CPU 21 to return to the standard power mode. In addition, the new data are transferred to the main CPU through the second buffer 44, etc., so that the main CPU 21 processes the new data. In this regard, the sub CPU 42 serves as a return requesting device and a transferring device. Thus, the previously received data for which connection has been established are processed by the sub CPU 42, and the new data and the following data are processed by the main CPU 21. Namely, both the sub CPU 42 and main CPU 21 perform data processing.

In contrast, when the second judging device judges that the received data should be processed by the main CPU 21 after establishment of connection, the network controller 40 requests the main CPU 21 to return to the standard power mode and to process the received data. In this case, the sub CPU 42 stores all or a necessary part of the data in a storage device (i.e., buffer 43 or 44 serving as a second storage device) to which the sub CPU can have access. Next, the sub CPU 42 performs controlling such that the stored data are transferred to a storage device (i.e., SDRAM 7 serving as a first storage device) to which the main CPU 21 can have access, and then the main CPU processes the received data. Thus, the sub CPU 42 serves as a transferring device (i.e., first and second transferring devices).

When the rest of a series of data or new data are received through the PHY 15 during the main CPU 21 is performing data processing, the sub CPU 42 transfers the data to the SDRAM 7 so that the main CPU processes the data. Thus, when the main CPU 21 is in the standard power mode and the sub CPU 42 does not process the received data, the network controller 40 stops the sub CPU by disabling the data processing function thereof while allowing the main CPU 21 to process the data. Thus, the network controller 40 serves as a device for disabling the sub CPU 42.

Next, the method of controlling the printer 1 in the processing of data received from an external device, for example, by switching the power consumption mode of the main CPU 21 will be explained.

Hereinafter, a case where the printer 1 receives a series of packets including a connection establishment request packet and other plural packets from an external device, and at first the sub PCU 42 processes the received data (packets) will be explained. Therefore, before the processings mentioned below, the power consumption mode of the main CPU 21 has been switched from the standard power mode to a power saving mode. Thus, when the main CPU 21 is in a power saving mode, the sub CPU 42 processes the received data, and judges whether the data should be processed by the main CPU or the sub CPU 42 depending on the kind of the received data. In this case, the sub CPU determines which CPU should process the received data from the port number of the packets, and the designated CPU (i.e., the main CPU 21 or the sub CPU 42) processes the received data. Hereinafter, the processing procedure and operation of the printer 1 will be explained by reference to the following plural cases.

1. Case where the Sub CPU 42 Processes the Received Data

Figure 3:
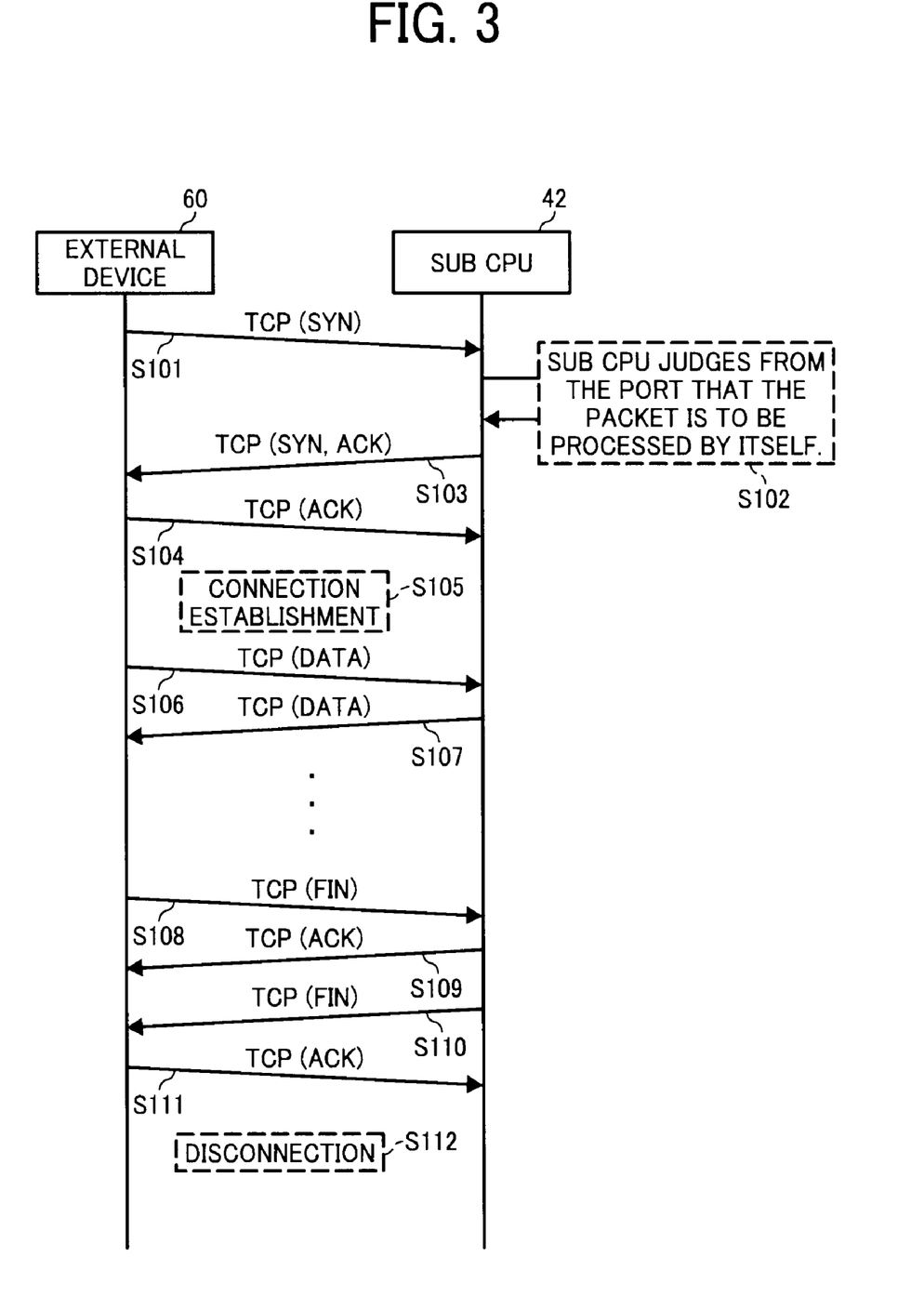
FIGS. 3-6 are flowcharts of data processing in examples of the information processing apparatus of the present invention.

FIG. 3 is a flowchart (sequence chart) of data processing in this case, and illustrates data flow between an external device 60 (e.g., host computers) and the sub CPU 42.

In FIG. 3, a character TCP represents a packet to be sent or received, and flow of the packet is indicated by an arrow. In addition, each TCP has a character SYN, FIN, or ACK in a parenthesis, which respectively represents a connection establishment request packet, a connection finish request packet, and an acknowledgment packet to a request packet, to distinguish the packets from data packets (i.e., packets including data to be processed).

One of the packets to be thus processed is a print packet. As illustrated in FIG. 3, at first the external device 60 sends a TCP (SYN) of requesting connection establishment to the sub CPU 42 in step S101. When sub CPU 42 judges from the port of the packet that the packet is to be processed by the sub CPU itself (step S102), the sub CPU sends a TCP (SYN, ACK) including a response packet and a connection establishment request packet to the external device 60 in step S103. The external device 60 sends a response TCP (ACK) to the sub CPU 42 in step 104.

In response to the TCP (ACK), the sub CPU 42 establishes communication connection with the external device 60 in step S105. Next, TCPs (DATA) including a variety of data are sent and received between the external device 60 and the sub CPU 42 in steps S106 and S107, and then the sub CPU 42 performs a packet processing including a packet response, for example. When receiving a TCP (FIN) of requesting finish of connection from the external device 60 (step S108), the sub CPU 42 sends a response TCP (ACK) (step S109) and a TCP (FIN) of requesting finish of connection to the external device 60 (step S110). In response to the TCP (FIN), the external device 60 sends a TCP (ACK) to the sub CPU 42. When receiving the TCP (ACK) from the external device 60 (step S111), the sub CPU 42 cuts the connection with the external device 60 (step S112).

2. Case where the Main CPU 21 Processes the Received Data

Figure 4:
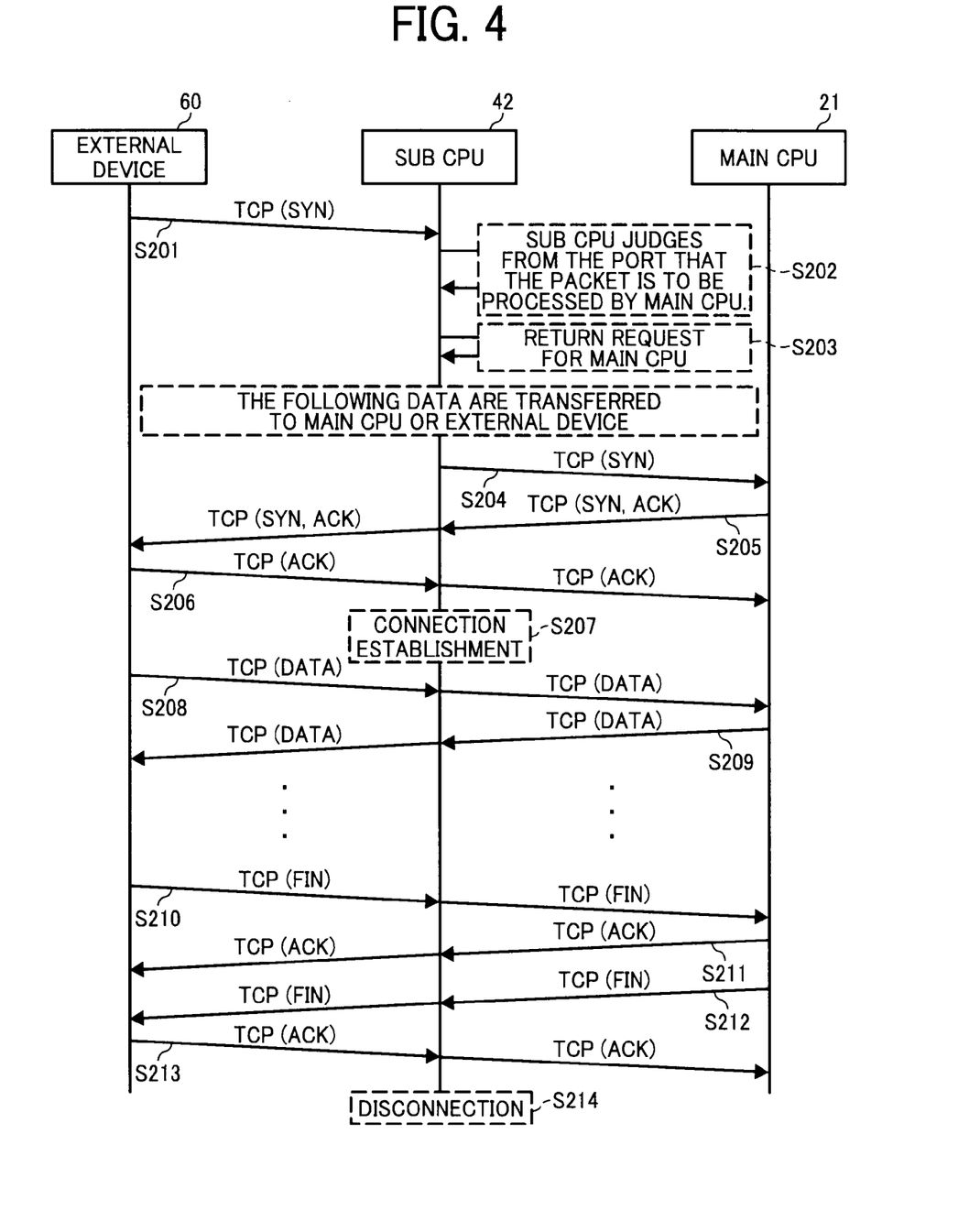

FIG. 4 is a flowchart of data processing in this case, and illustrates data flow among the external device 60 (e.g., host computers), the sub CPU 42 and the main CPU.

In this case, at first the external device 60 sends a TCP (SYN) of requesting connection establishment to the sub CPU 42 (step S201). When the sub CPU 42 judges from the port of the packet that the data (packet) should be processed by the main CPU 21 (step S202), for example, the sub CPU outputs the signal D to return the main CPU 21 to the standard power mode (step S203). Thereafter, the sub CPU 42 transfers the received/sent data to the main CPU 21 or the external device 60. In this regard, the received data are transferred to the second buffer 44, and then transferred to the SDRAM 7 to be processed by the main CPU 21.

When a TCP (SYN) sent from the external device 60 is transferred by the sub CPU 42 to the main CPU 21 (step S204), the main CPU sends a TCP (SYN, ACK) including a response and a connection establishment request to the external device 60 through the sub CPU (step S205). Hereinafter packets are sent and received through the sub CPU 42 as illustrated in FIG. 4. When a TCP (ACK) is received from the external device 60 (step S206), connection is established between the external device and the main CPU 21 through the sub CPU (step S207). After TCPs (DATA) are sent and received therebetween (steps S208 and S209), the main CPU 21 processes the data. When receiving a TCP (FIN) of requesting finish of connection from the external device 60 (step S210), the main CPU 21 sends a response TCP (ACK) (step S211) and a TCP (FIN) of requesting finish of connection to the external device (step S212). Upon receipt of a TCP (ACK) from the external device 60 (step S213), the connection established therebetween through the sub CPU 42 is cut (step S214).

3. Case where it Cannot be Judged Whether to Process the Data with Main CPU or Sub CPU 3(1) Case where the Sub CPU 42 Processes the Received Data FIG. 5 is a flowchart of data processing in this case, and illustrates data flow between the external device 60 and the sub CPU 42.

Figure 5:
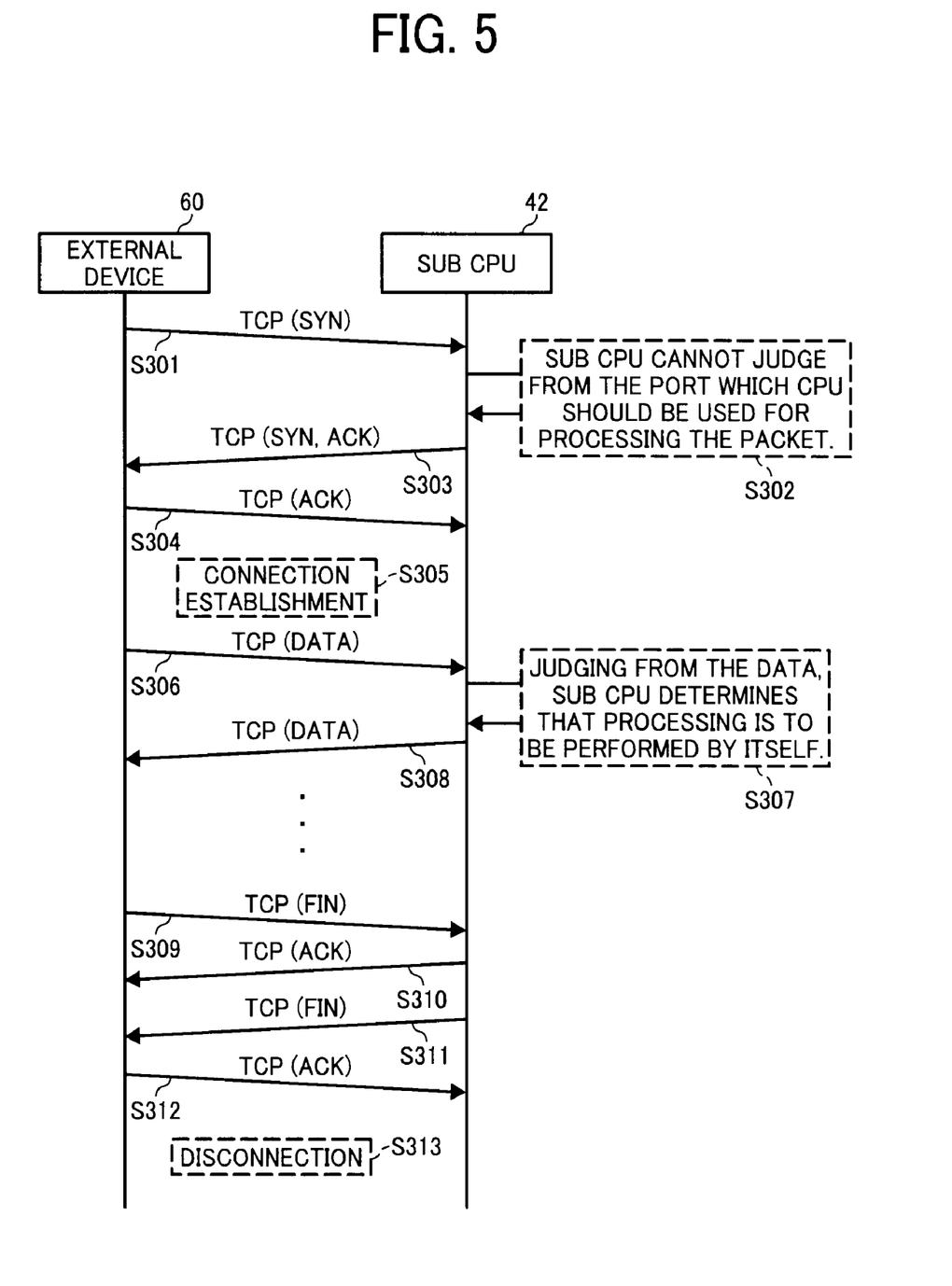

As illustrated in FIG. 5, at first a TCP (SYN) of requesting connection establishment is sent from the external device 60 to the sub CPU 42 (step S301). When the sub CPU 42 cannot determine from the port of the TCP whether the data (packet) should be processed by the main CPU 21 or the sub CPU 42 (step S302), the sub CPU sends a TCP (SYN, ACK) including a response packet and a connection establishment request packet to the external device 60 (step S303). When receiving a response TCP (ACK) from the external device 60 (step S304), communication connection is established between the sub CPU 42 and the external device 60 (step S305).

After connection is established, the external device 60 sends a TCP (DATA) to the sub CPU 42 (step S306). When receiving the TCP (DATA), the sub CPU 42 judges from the received data whether the data should be processed by the main CPU 21 or the sub CPU 42. When it is judged that the data should be processed by the sub CPU 42 (step S307), the TCP (DATA) are sent and received therebetween (step S308). Thus, the data are processed by the sub CPU 42. When receiving a TCP (FIN) of requesting finish of connection from the external device 60 (step S309), the sub CPU 42 sends a response TCP (ACK) (step S310) and a TCP (FIN) of requesting finish of connection to the external device 60 (step S311). Upon receipt of a response TCP (ACK) from the external device 60 (step S312), the connection between the external device and the sub CPU is cut (step S313)

If new data are received when the sub CPU 42 is processing the received data and it is determined that the main CPU 21 should process the new data, the sub CPU 42 allows the main CPU to return to the standard power mode. In addition, the sub CPU 42 transfers the new data to the main CPU 21 so that the main CPU 21 processes the data. Thus, both the sub CPU 42 and the main CPU 21 perform respective data processings.

3(2) Case where the Main CPU 21 Processes the Received Data

Figure 6:
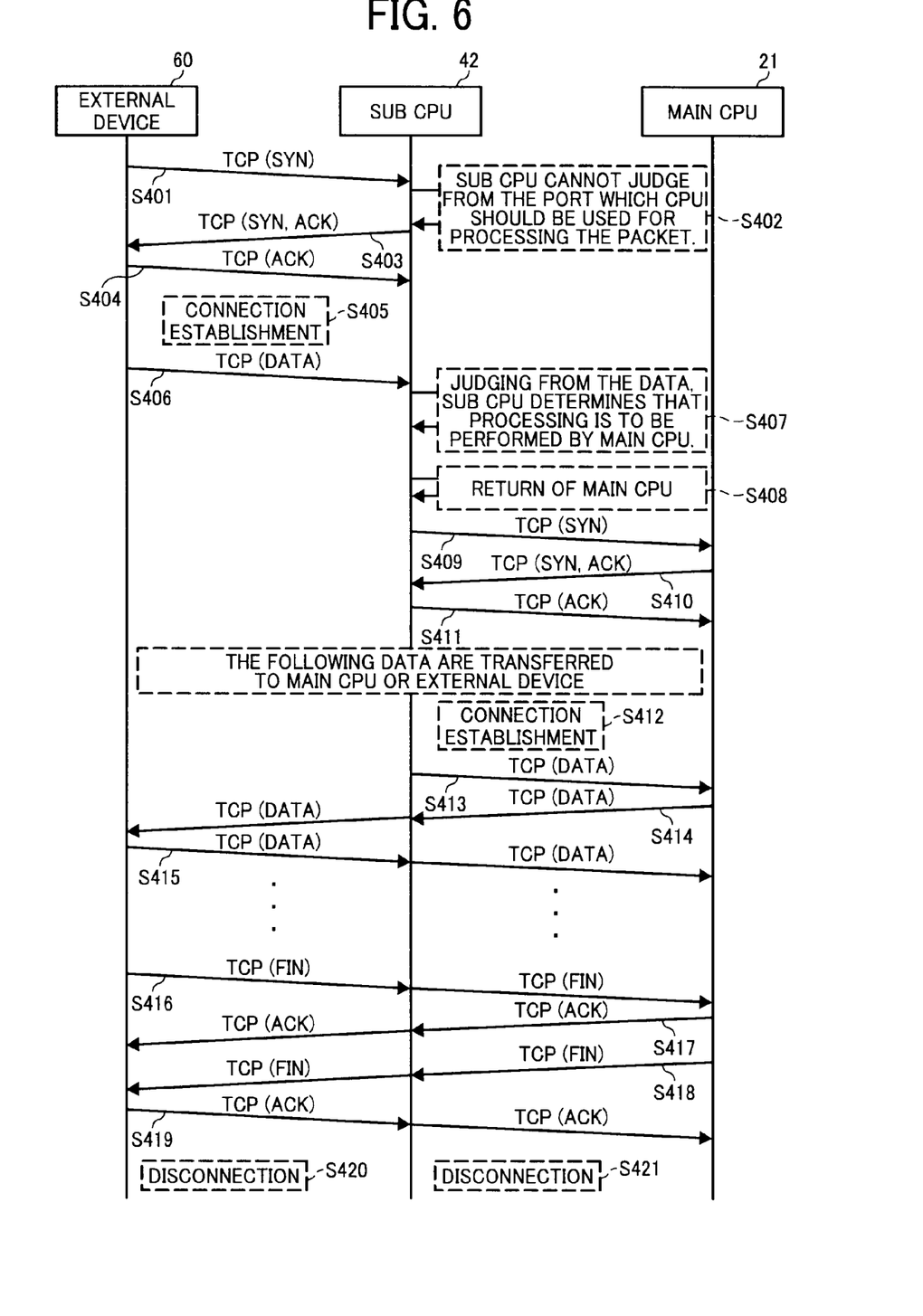

FIG. 6 is a flowchart of data processing in this case, and illustrates data flow among the external device 60, the sub CPU 42 and the main CPU 21.

As illustrated in FIG. 6, processings similar to those in steps S301 to S306 are performed. Specifically, data are sent/received between the external device 60 and the sub CPU 42 so that communication connection is established therebetween and the sub CPU receives a TCP (DATA) from the external device (steps S401 to S406). When the sub CPU 42 determines that the main CPU 21 should process the data (step S407), the sub CPU allows the main CPU to return to the standard power mode (step S408) so that the main CPU processes the data sent from the external device 60.

In this case, connection is established between the external device 60 and the sub CPU 42, and a TCP connection is not established between the external device and the main CPU 21 in the software. Therefore, it is necessary to establish connection between the external device 60 and the main CPU 21. Accordingly, the sub CPU 42 once stores the data (all the data or a necessary part of the data) including the connection packet received from the external device 60, with which the sub CPU establishes connection, in the first buffer 43, and then transfers the stored data to the second buffer 44 when it is judged that the data should be processed by the main CPU 21. In this case, when receiving a signal notifying that the SDRAM 7 is usable from the SDRAM controller 23, the sub CPU 42 transfers the data stored in the second buffer 44 to the SDRAM 7, to which the main CPU 21 can have access, so that the main CPU 21 processes the data. According to the transferred packets including the connection establishment request packet, the main CPU 21 starts to establish connection with the sub CPU 42 to be connected with the external device 60 through the sub CPU 42. Thereafter, the sub CPU 42 transfers sent/received data so that normal TCP transmission is performed.

Specifically, at first the sub CPU 42 sends a TCP (SYN) of requesting establishment of connection to the main CPU 21 (step S409), and then the main CPU sends a TCP (SYN, ACK) to the sub CPU (step S410), followed by sending a TCP (ACK) to the main CPU from the sub CPU (step S411), resulting in establishment of connection therebetween (step S412). Thereafter, the sub CPU 42 transfers the sent/received data to the main CPU 21 or the external device 60. Specifically, at first the sub CPU 42 transfers the TCP (DATA) including the previously received data to the main CPU 21 (step S413). Next, sending and receiving of TCP (DATA) are performed between the main CPU 21 and the external device 60 through the sub CPU 42 (steps S414 and S415) so that the main CPU can process the data.

When receiving a TCP (FIN) of requesting finish of connection from the external device 60 through the sub CPU 42 (step S416) after the data processing, the main CPU 21 sends a response TCP (ACK) (step S417) and a TCP (FIN) of requesting finish of connection (step S418). When the main CPU 21 receives a response TCP (ACK) from the external device 60 through the sub CPU 42 (step S419), connection between the external device and the sub CPU and connection between the sub CPU and the main CPU are cut (steps S420 and S421).

In this case, if the sub CPU 42 receives the rest of a series of data and new data from the external device 60 when the main CPU 21 is performing data processing, the sub CPU transfers the data to the main CPU to be processed by the main CPU. Thus, when the main CPU 21 is in the standard power mode and in addition the sub CPU 42 does not process the received data, the network controller 40 disables the data processing function of the sub CPU 42 so that the main CPU 21 processes the received data.

Next, switching of a power consumption mode to another power consumption mode in the printer 1 (including switching of the power consumption mode of the main CPU 21 mentioned above) will be specifically explained.

Figure 7:
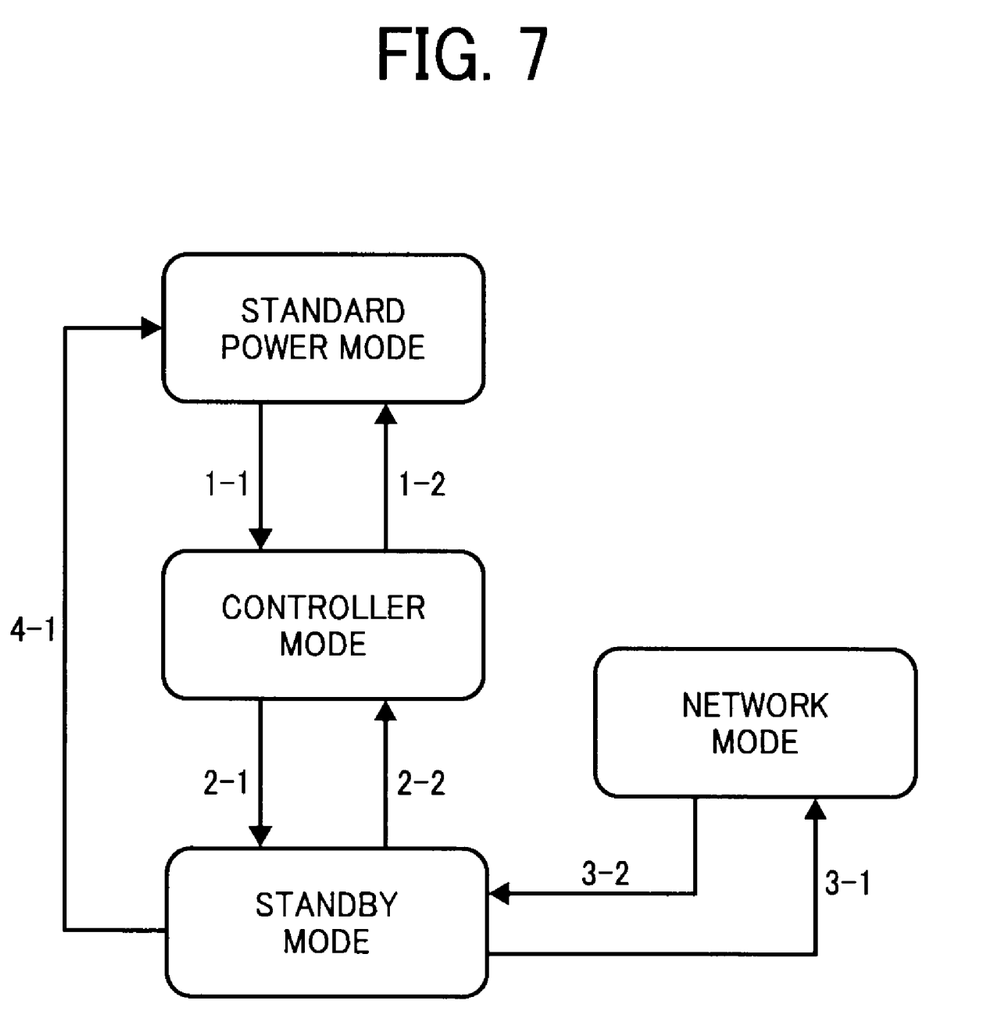
FIG. 7 is a schematic view illustrating the way to change the power consumption mode of an example of the information processing apparatus of the present invention.

FIG. 7 is a schematic view illustrating the way to change the power consumption mode of the printer 1. The method of changing the power consumption mode will be explained in order of number (i.e., 1-1 to 3-2) in FIG. 7.

1. Transition Between Standard Mode and Controller Mode
1-1 Transition from Standard Mode to Controller Mode For example, when the operation of the plotter 3 is not performed for a predetermined time, or an energy save return/transition key (hereinafter referred to as an energy save key) (not shown) is pushed by a user, the power consumption mode is switched from the standard power mode to the controller mode. In the case where the operation of the plotter 3 is not performed for a predetermined time, the main CPU 21 detects the situation, and orders the power management controller 10 to turn off the power for the plotter 3. In this case, the power management controller 10 outputs the signal G through the external power controller 12, thereby turning off the power for the plotter 3 and switching the power consumption mode of the printer 1 from the standard mode to the controller mode.

1-2 Transition from Controller Mode to Standard Mode

For example, when the printer 1 receives print data or a print request data from the external device 60 or the energy save key (not shown) is pushed by a user to return the printer, the power consumption mode is switched from the controller mode to the standard power mode. For example, when a print request data is received from the external device 60, the sub CPU 42 of the network controller 40 outputs the return request signal D including a plotter return request to the power management controller 10. Next, the power management controller 10 outputs the signal G trough the external power controller 12 to return the power supply to the plotter 3 so that the plotter returns to the normal operating state and the printer 1 achieves the standard power mode. At the same time, the power management controller 10 transfers the print data stored in the second buffer 44 to the SDRAM 7 through the SDRAM controller 23 so that the print data are stored in the SDRAM 7. The main CPU 21 processes the print data and transfers the processed print data to the plotter 3, and then the plotter 3 outputs a paper sheet on which an image is printed according to the print data.

2. Transition Between Controller Mode and Standby Mode
2-1 Transition from Controller Mode to Standby Mode For example, when the printer receives no data to be processed by the main CPU 21 for a predetermined time, or no operation is ordered by the operation section 5 for a predetermined time while the energy save key (not shown) is not pushed for a predetermined time, namely, when no event is made for a predetermined time, the power consumption mode is changed from the controller mode to the standby mode. When the main CPU 21 confirms that no event is made for a predetermined time, the main CPU 21 requests the power management controller 10 to cut power off so that the main CPU 21, and the SDRAM 7 achieve respective power saving modes, i.e., the sleep mode, and the self refresh mode, and part of the controller board 2 and part of the ASIC 20 (surrounded by a dotted line in FIG. 1) have a power saving mode. In response to the request, the power management controller 10 outputs the signals A, B and C while outputting the signals E and F through the board power controller 11. By outputting the signals A, B, C, E and F, the main CPU 21 is transferred to a power saving mode, the SDRAM 7 is transferred to the self refresh mode, each of the part of the controller board 2 and the part of the ASIC 20 is transferred to a power saving mode, and the printer 1 is transferred to the standby mode.

2-2 Transition from Standby Mode to Controller Mode

For example, when the external device 60 sends a packet of requesting read out of image data stored in the HDD 6 to the printer, the power consumption mode of the printer 1 is changed from the standby mode to the controller mode. Specifically, in this case, the sub CPU 42 of the network controller 40 outputs the return request signal D including a request to return to the controller mode to the power management controller 10. Next, the power management controller 10 outputs the signals A, B and C while outputting the signals E and F through the board power controller 11, so that the main CPU 21 is transferred to the standard power mode from a power saving mode, the SDRAM 7 is transferred to the standard power mode from the self refresh mode, each of the part of the controller board 2 and the part of the ASIC 20 (surrounded by a dotted line in FIG. 1) is transferred to the standard power mode from the power saving mode, and the printer 1 is transferred to the controller mode from the standby mode. In the printer having this state, the packet of requesting read out of the image data stored in the second buffer 44 is transferred to the SDRAM 7 and then the main CPU 21 reads out the image data from the HDD 6 to transfer the image data to the requestor (i.e., the external device 60). Thus, the external device 60 obtains the image data.

3. Transition Between Standby Mode and Network Mode 3-1 Transition from Standby Mode to Network Mode For example, when the printer 1 receives a MIB request data, the power consumption mode of the printer is changed from the standby mode to the network mode. In this case, the sub CPU 42 of the network controller 40 outputs the return request signal D of requesting the main CPU to return to the controller mode to notify the power management controller 10. Next, the power management controller 10 outputs the signals A and B to transfer the mode of the main CPU 21 from the power saving mode to the standard power mode while transferring the mode of the SDRAM 7 from the self refresh mode to the standard power mode. Thereby, the power consumption mode of the printer 1 is changed from the standby mode to the network mode, and the data (such as MIB request) stored in the second buffer 44 are transferred to the SDRAM 7. The main CPU 21 processes the data similarly to the processing of normal network data.

3-2 Transition from Network Mode to Standby Mode

For example, when processing of received data is completed after the printer 1 is transferred from the standby mode to the network mode, the printer is transferred from the network mode to the standby mode. In this case, when the main CPU 21 confirms that the data processing is completed, the main CPU 21 requests the power management controller 10 to cut power off so that the main CPU 21 and the SDRAM 7 achieve the power saving mode and the self refresh mode, respectively. In response to the request, the power management controller 10 outputs the signals A and B to transfer the main CPU 21 and the SDRAM 7 to the power saving mode and the self refresh mode, respectively, and to transfer the mode of the printer 1 to the standby mode.

4. Transition Between Standby Mode and Standard Power Mode 4-1 Transition from Standby Mode to Standard Power Mode For example, when the printer 1 receives print data or a print request from the external device 60 or the energy save key is pushed in the standby mode, the mode of the printer is transferred from the standby mode to the standard mode. In the case where the printer 1 receives print data from the external device 60, the sub CPU 42 of the network controller 40 outputs the return request signal D of requesting the plotter 3 to return to the operable state to the power management controller 10. Next, the power management controller 10 outputs the signals A, B and C while outputting the signals E and F through the board power controller 11, so that the main CPU 21 is transferred to the standard power mode from the power saving mode by the signal A, the SDRAM 7 is transferred to the standard power mode from the self refresh mode by the signal B, and each of the part of the controller board 2 and the part of the ASIC 20 (surrounded by a dotted line in FIG. 1) is transferred to the standard power mode from the power saving mode. In addition, the power management controller 10 outputs the signal G through the external power controller 12 to return the power supply for the plotter 3 so that the plotter achieves the normal operable state and the printer 1 is transferred to the standard power mode. Next, the print data stored in the second buffer 44 are transferred to the SDRAM 7, and the main CPU 21 processes the print data and sends the processed data to the plotter 3. Thus, the plotter 3 outputs one or more paper sheets on which images are printed according to the print data.

As mentioned above, the printer 1 switches the power consumption mode thereof among plural power consumption modes depending on the received data or according to the predetermined conditions, and supplies a power to the necessary portions to process the received data while shutting off an unnecessary power supply to reduce the power consumption of the printer. In addition, when the printer 1 has the standby mode and receives data to be processed by the main CPU 21, the main CPU is returned to the standard power mode. After the main CPU 21 processes the data, the main CPU is transferred again to the power saving mode. Thus, the power consumption mode of the printer 1 is switched. However, when the received data are data for which connection has to be established and maintained between the external device 60 and the sub CPU 42 or the main CPU 21, the power consumption mode of the printer 1 is not switched even when one processing of the received data has been completed, and the power consumption mode of the printer is switched after a series of data processings are completed.

In this example, in this data processing the sub CPU 42 judges whether the data received when the main CPU 21 is in a power saving mode should be processed by the main CPU 21 or the sub CPU 42. When the sub CPU 42 cannot determine from the data whether the received data should be processed by the main CPU 21 or the sub CPU 42, the sub CPU establishes connection with the external device 60 without changing the power saving mode of the main CPU 21 and then performs controlling so that data are received/sent by the sub CPU to be processed by the sub CPU. Thus, in this printer it is unnecessary to return the mode of the main CPU to the standard power mode when receiving such data. Therefore, the period during which the main CPU 21 is in a power saving mode can be prolonged, resulting in effective reduction of the power consumption of the printer 1.

After connection establishment, the sub CPU 42 determines from the following data whether the main CPU 21 or the sub CPU 42 should process the data received from the external device 60. When it is determined that the data are processed by the main CPU 21, the sub CPU 42 requests the main CPU to return to the standard power mode so that the main CPU processes the data. In contrast, when it is determined that the data are processed by the sub CPU 42, the sub CPU processes the data while maintaining the main CPU 21 in the power saving mode. Thus, the main CPU 21 is returned to the standard power mode in case of necessity (i.e., it is not necessary to uneconomically switch the mode of the main CPU to the standard power mode), the power consumption of the printer 1 can be reduced.

As mentioned above, the frequency of return of the main CPU 21 to the standard power mode can be decreased, and thereby the period during which the main CPU is in a power saving mode can be prolonged, resulting in reduction of the power consumption of the printer 1. In particular, even when receiving periodical query protocols such as WSD, which have been frequently used, the printer 1 can respond thereto without uneconomically returning the main CPU 21 to the standard power mode. Thus, the number of switching of the mode of the main CPU 21, etc. to the standard power mode can be decreased, resulting in prolongation of the time during which the main CPU is in a power saving mode. In addition, when the received data are a packet of requesting connection establishment included in a series of communication data, the sub CPU 42 can normally perform communication without changing the mode of the main CPU 21 and the software. Therefore, the power consumption of the printer 1 can be reduced and in addition data processing can be smoothly performed.

When the printer 1 receives new data (such as connection packets) while the sub CPU 42 is performing a data processing, the network controller 40 judges whether the new data should be processed by the main CPU 21 or the sub CPU 42. When it is determined that the new data are processed by the main CPU, the sub CPU 42 requests the main CPU 21 to return to the standard power mode and transfers the new data to the main CPU so that the main CPU processes the data. Thus, the main CPU 21 and the sub CPU 42 perform their respective data processings, resulting in enhancement of data processing efficiency. In addition, the previously received data, for which connection has been already established, are processed by the sub CPU 42 without transferring the data to the main CPU. Thus, it is unnecessary to store all the received data, and therefore the capacity of the buffers 43 and 44 of the network controller 40 can be reduced.

In addition, when it is determined that the data are processed by the main CPU 21 after connection establishment, the data stored in the sub CPU 42 are transferred to the SDRAM 7. In this case, the main CPU 21 processes the data after connection establishment between the main CPU and the sub CPU. The following data that the sub CPU 42 receives thereafter are transferred to the main CPU 21. Thus, the main CPU 21 can communicate with the external device 60 sending the data and processes the received data. Since the sub CPU 42 performs only the data transmission during this communication, the power necessary for data processing can be reduced, resulting in further reduction of the power consumption of the printer 1. In addition, the main CPU 21 communicates with the external device 60 through the sub CPU 42 without being directly connected with the external device 60. Therefore, the main CPU 21 can precisely communicate with the external device 60 without changing the software so as to be used for the connection. Therefore, occurrence of a problem caused by change of software can be prevented.

Further, when the main CPU 21 is performing data processing, the sub CPU 42 transfers the received data to the SDRAM 7 without performing another processing. Therefore, overhead due to communication can be decreased. In addition, under normal conditions of the printer 1, the main CPU 21, which has a higher capacity than the sub CPU 42, can be effectively used to quickly perform data processing. Further, when the main CPU 21 is in the standard power mode (i.e., when the main CPU can perform data processing) and the sub CPU 42 does not perform data processing, the data processing function of the sub CPU is disabled. Therefore, the power consumption of the printer 1 can be further reduced.

The present invention can be realized by describing the steps (processes) of the method for controlling an information processing apparatus, which method is explained above by reference to a printer, as program using a program language. In addition, the present invention can be realized by reading the program, which is stored in a computer readable recording medium such as flexible disks, CD-ROMs, DVD-ROMs and MOs, using a computer.

As mentioned above, according to the present invention, the frequency of returning an information processing apparatus, which has plural switchable power consumption modes, to the standard power mode from a power saving mode can be decreased. Therefore, the period during which the image processing apparatus is in a power saving mode can be prolonged, and thereby the power consumption of the image processing apparatus can be reduced.

This document claims priority and contains subject matter related to Japanese Patent Application No. 2008-148284, filed on Jun. 5, 2008, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An information processing apparatus, which performs data communication with an external device, and which operates in a standard power mode, in which all parts of the information processing apparatus are in a standard power mode, or in a power saving mode, in which some parts of the information processing apparatus are in a power saving mode, the information processing apparatus comprising:

a first data processor, which is configured to process data sent from the external device and which can switch a power consumption mode from a standard power mode, in which the first data processor performs data processing, to a power saving mode, in which the first data processor does not perform data processing, or vice versa;

a switcher configured to switch the information processing apparatus between the standard power mode and the power saving mode; and a second data processor configured to process the data sent from the external device when the first data processor is in the power saving mode, and includes:

a first judging device configured to make a judgment as to whether the data are to be processed by the first data processor or the second data processor depending on the data; and a connection establishing device configured to establish communication connection with the external device when the first judging device cannot make the judgment from the data, wherein the second data processor further includes:

a second judging device configured to make a judgment as to whether the data are to be processed by the first data processor or the second data processor depending on following data received from the external device after the connection establishing device establishes communication connection, wherein when the second judging device determines that the data are to be processed by the second data processor, the second data processor processes the data;

a return requesting device configured to request the first data processor to return to the standard power mode when the first judging device determines that new data received when the second data processor is processing the data are to be processed by the first processor; and a transferring device configured to transfer the new data to the first data processor so that the first data processor processes the new data while the second data processor processes the data, and wherein after the first judging device judges that the new data are to be processed by the first data processor, the first judging device determines based on the new data whether a part of the information processing apparatus other than the first data processor is to be returned to the standard power mode.

2. The information processing apparatus according to claim 1, wherein the data that the second data processor processes when the first data processor is in the power saving mode, includes a packet of requesting connection establishment, which is included in a series of communication data.

3. The information processing apparatus according to claim 1, wherein the return requesting device is configured to request the first data processor to return to the standard power mode when the second judging device determines from the following data that the data are to be processed by the first data processor.

4. The information processing apparatus according to claim 3, further comprising:
a first storage device to which the first data processor is accessible; and
a second storage device which is configured to store the data received from the external device after the connection establishing device establishes communication connection and to which the second data processor is accessible, wherein
the transferring device is configured to transfer the data stored in the second storage device to the first storage device when the second judging device determines that the data are to be processed by the first data processor, so that the first data processor processes the data transferred to the first storage device.

5. The information processing apparatus according to claim 4, wherein the transferring device is configured to transfer the data received from the external device to the first storage device when the first data processor is performing data processing.

6. The information processing apparatus according to claim 1, further comprising:
a device configured to disable the second data processor when the first data processor is in the standard power mode and the second data processor does not perform data processing.

7. A method for controlling an information processing apparatus which operates in a standard power mode, in which all parts of the information processing apparatus are in a standard power mode, or in power saving mode, in which some parts of the information processing apparatus are in a power saving mode, the information processing apparatus including a first data processor which is configured to process data sent from an external device and which can switch a power consumption mode from a standard power mode to a power saving mode, and a second data processor configured to process the data sent when the first data processor is set to the power saving mode, said method comprising:
switching the information processing apparatus between the standard power mode and the power saving mode; and
processing the data using the second data processor when the first data processor is in the power saving mode, wherein processing includes:
making a first judgment as to whether the data are to be processed by the first data processor or the second data processor depending on the data; and
establishing communication connection with the external device when the second data processor cannot make the judgment from the data,
wherein the data processing step using the second data processor includes:
establishing communication connection with the external device when the first judgment cannot be made from the data to receive following data from the external device;
when it is not determined in the first judgment step whether the data are to be processed by the first data processor or the second data processor, making a second judgment as to whether the data are to be processed by the first data processor or the second data processor depending on the following data received from the external device after establishing the communication connection; and
when it is determined in the second judgment step that the data are to be processed by the second processor, processing the data using the second data processor,
wherein when new data are received during the data processing of the second processor, and it is determined in the first judgment step that the new data are to be processed by the first data processor, the data processing step further comprises
returning the first data processor to the standard power mode; and
processing the new data using the first data processor so that the first data processor processes the new data while the second data processor processes the data,
wherein after judging that the new data are to be processed by the first data processor, the second data processor determines based on the new data whether a part of the information processing apparatus other than the first data processor is to be returned to the standard power mode.

8. The method according to claim 7, wherein the data processed using the second data processor in the data processing step includes a packet of requesting connection establishment, which is included in a series of communication data.

9. The method according to claim 7, wherein the data processing step further includes:
when it is determined in the second judgment step that the data are to be processed by the first data processor, requesting the first data processor to return to the standard power mode; and
processing the data sent from the external device using the first data processor.

10. The method according to claim 9, wherein the data processing step further includes:
storing the following data received from the external device after communication connection is established;
transferring the stored data to a storage device, to which the first data processor is accessible, when it is determined in the second judgment step that the data are to be processed by the first data processor; and processing the transferred data using the first data processor.

11. The method according to claim 10, wherein the data processing step further includes:

transferring the data sent from the external device and received by the second data processor to the storage device to which the first data processor is accessible when the first data processor is performing data processing.

12. The method according to claim 7, wherein the data processing step further includes:

disabling the second data processor when the first data processor is in the standard power mode and the second data processor does not perform data processing.

13. A computer readable medium storing computer instructions for performing the method according to claim 7.

14. An information processing apparatus, which performs data communication with an external device, and which operates in a standard power mode, in which all parts of the information processing apparatus are in a standard power mode, or in a power saving mode, in which some parts of the information processing apparatus are in a power saving mode, the information processing apparatus comprising:

a first data processor, which is configured to process data sent from the external device and which can switch a power consumption mode from a standard power mode, in which the first data processor performs data processing, to a power saving mode, in which the first data processor does not perform data processing, or vice versa;

a switcher configured to switch the information processing apparatus between the standard power mode and the power saving mode; and a second data processor configured to process the data sent from the external device when the first data processor is in the power saving mode, and includes:

a first judging device configured to make a judgment as to whether the data are to be processed by the first data processor or the second data processor depending on the data; and a connection establishing device configured to establish communication connection with the external device when the first judging device cannot make the judgment from the data, wherein the power saving mode is one of a controller mode, in which a plotter is in a power saving mode and other parts of the information processing apparatus are in standard power mode, a network mode, in which an operation section, a hard disk drive, and an input/output interface are in a power saving mode, and a standby mode in which the first data processor and synchronous dynamic RAM (SDRAM) are in a power saving mode.

* * * * *

UNITED STATES PATENT AND TRADEMARK OFFICE
CERTIFICATE OF CORRECTION

| | | |
|---|---|---|
| PATENT NO. | : 8,352,664 B2 | Page 1 of 1 |
| APPLICATION NO. | : 12/430995 | |
| DATED | : January 8, 2013 | |
| INVENTOR(S) | : Shohichi Satoh | |

It is certified that error appears in the above-identified patent and that said Letters Patent is hereby corrected as shown below:

On the title page, Item (30), the Foreign Application Priority Data is incorrect. Item (30) should read:

-- (30)     Foreign Application Priority Data

Jun. 5, 2008   (JP) ..............................2008-148284 --

Signed and Sealed this
Nineteenth Day of March, 2013

Teresa Stanek Rea
*Acting Director of the United States Patent and Trademark Office*